United States Patent [19]
Sterman et al.

[11] 3,844,678
[45] Oct. 29, 1974

[54] COOLED HIGH STRENGTH TURBINE BUCKET

[75] Inventors: Albert P. Sterman, Cincinnati, Ohio; Robert B. Solda, Peabody, Mass.; Thomas A. Auxier, Irvine, Ky.

[73] Assignee: General Electric Company, Lynn, Mass.

[22] Filed: Apr. 26, 1972

[21] Appl. No.: 247,511

Related U.S. Application Data

[63] Continuation of Ser. No. 684,071, Nov. 17, 1967.

[52] U.S. Cl. .................................. 416/97, 415/115
[51] Int. Cl. .............................................. F01d 5/08
[58] Field of Search ..... 415/115; 416/90, 92, 95–97

[56] References Cited
UNITED STATES PATENTS

| | | | |
|---|---|---|---|
| 2,489,683 | 11/1949 | Stalker | 415/115 UX |
| 2,906,495 | 9/1959 | Schum et al. | 416/92 |
| 2,956,773 | 10/1960 | French | 416/90 |
| 3,045,965 | 7/1962 | Bowmer | 416/90 |
| 3,094,310 | 6/1963 | Bowmer | 416/92 |

FOREIGN PATENTS OR APPLICATIONS

| | | | |
|---|---|---|---|
| 852,786 | 10/1952 | Germany | 416/97 |
| 879,485 | 6/1953 | Germany | 416/96 |

*Primary Examiner*—Everette A. Powell, Jr.

[57] ABSTRACT

A cooled turbine bucket includes integral base and airfoil portions, the hollow airfoil including an integral partition dividing the interior of the airfoil into two heat transfer regions. A cooling fluid such as air is introduced into one of the heat transfer regions and is discharged from the other heat transfer region, communication between the two regions being provided by a large number of throttling openings in the partition.

10 Claims, 4 Drawing Figures

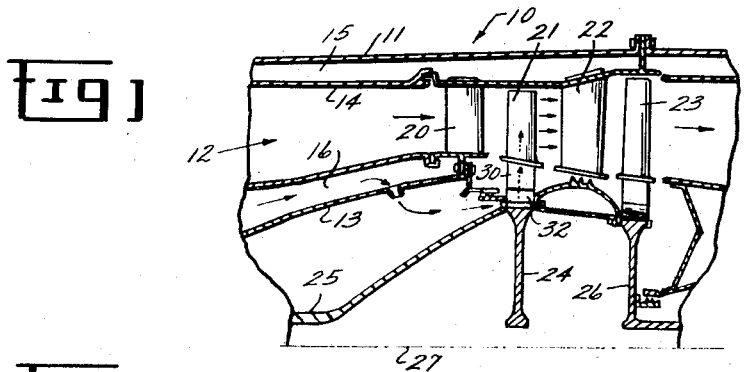
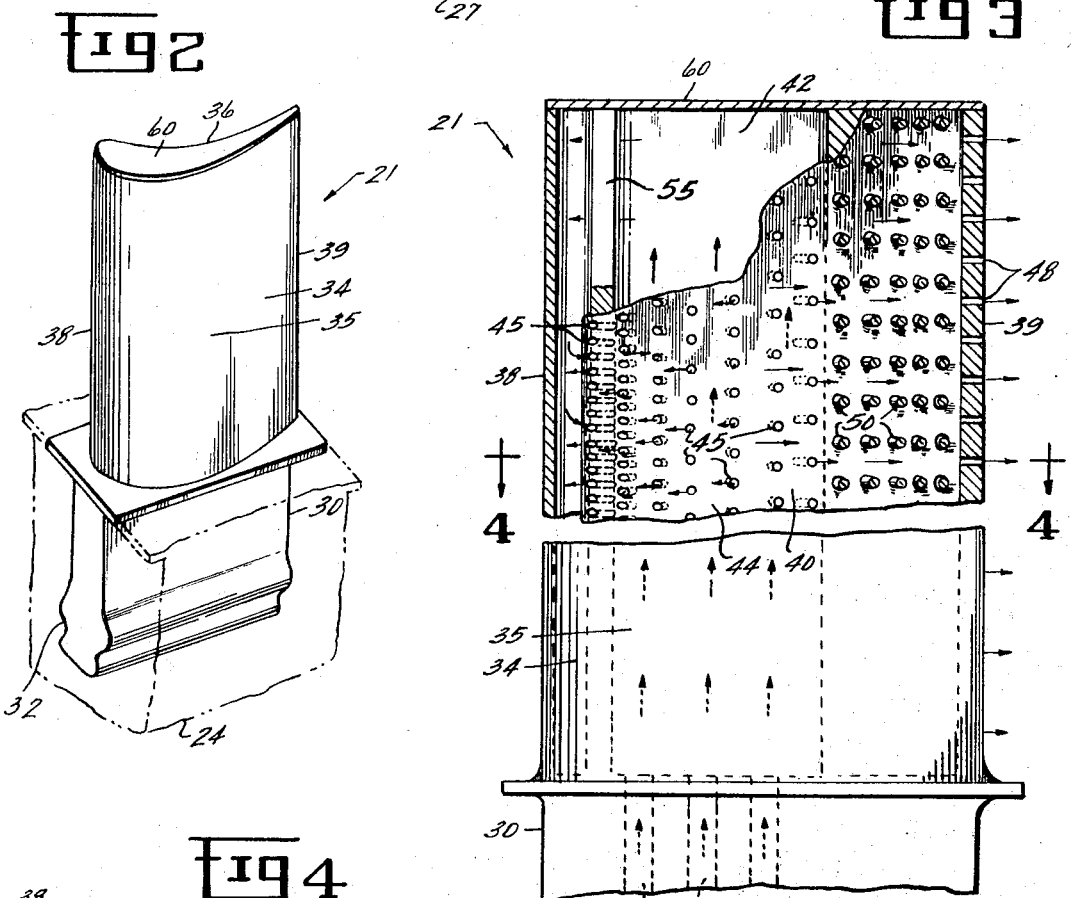
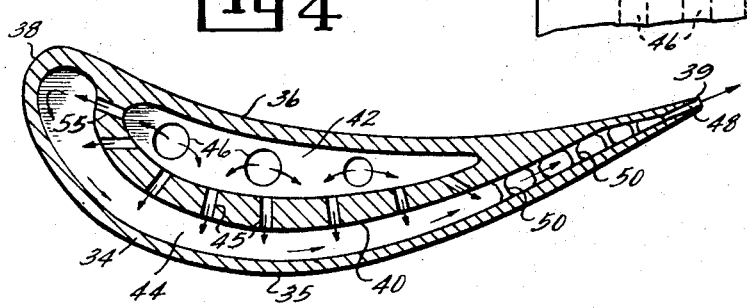

COOLED HIGH STRENGTH TURBINE BUCKET

This application is a Continuation application of abandoned application Ser. No. 684,071, filed Nov. 17, 1967.

This invention relates to turbine buckets for high temperature turbines and, more particularly, to a turbine bucket having improved means for controlling and directing the flow of cooling fluid throughout the bucket in an efficient and adequate manner while maintaining high strength and structural integrity.

It is well known that the efficiency of a gas turbine engine is related to the operating temperature of the turbine and may be increased by increasing the operating temperature. As a practical matter, however, the maximum turbine operating temperature is limited by the high temperature capabilities of the various turbine elements. Since the engine efficiency is thus also limited by temperature considerations, turbine designers have expended considerable effort toward increasing the high temperature capabilities of turbine elements, particularly the airfoil shaped vanes and buckets upon which high temperature combustion products impinge. Some increase in engine efficiency has been obtained by the development and use of new materials capable of withstanding higher temperatures. These new materials are not, however, generally capable of withstanding the extremely high temperatures desired in modern gas turbines. Consequently, various cooling arrangements have been devised for extending the upper operating temperature limit by keeping the airfoils at the lower temperatures which they are capable of withstanding without pitting or burning out.

Cooling of airfoils is generally accomplished by providing internal flow passages within the airfoils to accommodate the flow of a cooling fluid, the fluid typically being compressed air bled from either the compressor or the combustor. However, it is also well known that the engine efficiency theoretically possible is reduced by the extraction of cooling air. It is therefore imperative that cooling air be utilized effectively, lest the decrease in efficiency caused by the extraction of the air be greater than the increase resulting from the higher turbine operating temperature. In other words, the cooling system must be efficient from the standpoint of minimizing the quantity of cooling air required. It is also essential that all portions of the turbine airfoils be cooled adequately. In particular, adequate cooling must be provided for the leading and trailing edges of the airfoils, these portions being most adversely affected by the high temperature combustion gases. It has been found that cooling configurations available in the past have tended to have deficiencies with respect to the foregoing requirements. Cooling systems which use minimum quantities of cooling air commonly fail to cool adequately all portions of the airfoil. As a result, a critical portion such as the leading edge may crack, burn out, or pit after a relatively short operating period. On the other hand, those systems which adequately cool all portions of the airfoil, including the leading and trailing edges, commonly require too much air for efficient overall engine performance, the reason being that the cooling air is not used efficiently. For example, an inefficient arrangement may direct the cooling air through the interior of the airfoil in a manner which results in the creation of low convection heat transfer coefficients or rates of heat transfer. Other characteristics such as inadequate heat transfer area can also prevent effective use of the cooling air.

Moreover, the cooling configuration selected should maintain the structural integrity and strength of the airfoil without unduly complicating its design and manufacturing cost. In the case of turbine buckets, which are the airfoils carried by the high speed turbine rotor, these latter requirements can be very difficult to provide in combination with a cooling scheme that is theoretically effective and efficient. To understand these difficulties, it should be noted that, during operation of typical gas turbine engines, the total stress levels within typical turbine buckets reach stress magnitudes much higher than those ordinarily experienced by the stationary stator vanes. It is therefore imperative that the structural strength and integrity of the buckets be maintained in order to prevent a serious or even catastrophic failure during engine operation. However, it should be noted that cooling schemes that are highly effective and efficient when used for cooling lowly stressed stator vanes are not necessarily suitable for turbine buckets since the arrangements of cooling passages, etc., called for by such schemes may adversely affect the integrity and strength of the buckets.

It is therefore an object of this invention to provide a cooled turbine bucket in which high strength and structural integrity are maintained.

It is another object of this invention to provide a high strength turbine bucket in which cooling fluid is utilized in a highly efficient manner.

Still another object is to provide a high strength turbine bucket in which all portions of the bucket are cooled adequately.

A further object of this invention is to provide an improved turbine bucket having improved means for controlling and directing the flow of cooling fluid throughout the bucket in an adequate and efficient manner without adversely affecting the strength and structural integrity of the bucket.

A still further object of this invention is to provide the foregoing objects in a turbine bucket that is durable and dependable in operation and relatively simple and inexpensive to manufacture.

Briefly stated, in carrying out the invention in one form, a hollow turbine bucket includes a base portion for securing the bucket to a turbine rotor and a closed airfoil portion integrally formed with the base portion. The airfoil includes an integral partition within its hollow interior dividing the interior into a first region adjacent the mid-chord region of the airfoil's concave side wall and a second region adjacent the leading and trailing edges and the convex side wall of the airfoil. Inlet means are provided for admitting a cooling fluid such as air to the first region and outlet means are provided for discharging the cooling fluid from the second region. The partition has a plurality of throttling openings therein through which cooling fluid may be accelerated from the first region to the second region, the high velocity fluid impinging on selected wall surfaces within the second region to generate high local coefficients of heat transfer. In particular, the high velocity jets of cooling fluid are directed against the interior wall surfaces at the leading edge and along the upstream and mid-chord sections of the convex side wall, these regions being critical from a heat transfer standpoint. To maintain low thermal stresses, the throttling openings in the partition preferably include a slot extending the entire longitudinal length of the airfoil at a location closely adjacent the junction of the partition and the concave side wall.

By a further aspect of the invention, the outlet means includes a plurality of radially spaced-apart passages at the trailing edge of the airfoil, and turbulence producing means are provided in the second region upstream of the outlet passages for generating high local coefficients of convection heat transfer within the second region. To maintain the strength and structural integrity of the bucket, the turbulence producing means preferably comprises pins formed integrally with the remainder of the airfoil. By a still further aspect of the invention, the various portions of the bucket are proportioned, including the sizes and locations of the throttling openings, to assure adequate cooling of all airfoil portions with the minimum practicable flow of cooling fluid.

While the novel features of this invention are set forth with particularity in the appended claims, the invention, both as to organization and content, will be better understood and appreciated, along with other objects and features thereof, from the following detailed description taken in conjunction with the drawings, in which:

FIG. 1 is a sectional view of a portion of a gas turbine engine having cooled turbine buckets formed in accordance with the present invention;

FIG. 2 is a pictorial view of one of the turbine buckets of FIG. 1;

FIG. 3 is a view showing the turbine bucket of FIG. 2 in longitudinal section; and FIG. 4 is a view taken along line 4—4 of FIG. 3 showing the turbine bucket in transverse section.

Referring to the drawing, and particularly to FIG. 1, the high temperature portions of an axial flow gas turbine engine 10 are illustrated, the engine having an outer cylindrical casing 11 circumferentially surrounding the high temperature portions. The illustrated gas turbine structure includes an annular combustion space indicated generally by 12, the combustion space 12 being formed between the cylindrical casing 11 and an inner wall 13. An annular combustion liner 14 is located within the space 12 in spaced relation to the casing 11 and the wall 13, the actual combustion occurring within the annular combustion liner 14. The annular spaces 15 and 16 between the combustion liner 14 and the casing 11 and the wall 13, respectively, are filled with high pressure air discharged by the compressor (not shown). This high pressure air, which is quite cool relative to the high temperature combustion gases within the combustion liner 14, is admitted in a controlled manner to the interior of the combustion liner to support combustion and provide cooling therein. In accordance with the present invention, this relatively cool air is also used for cooling turbine buckets exposed to the high temperature combustion products.

Still referring to FIG. 1, an annular nozzle diaphragm 20 is located at the downstream end of the combustion liner 14 for supplying the hot products of combustion to a row of turbine buckets 21 at the proper velocity and at the proper angle, from which the combustion gases are redirected by an annular nozzle diaphragm 22 to a row of turbine buckets 23. The turbine buckets 21 are peripherally mounted on a turbine wheel 24 which, along with its associated shaft 25 and a second turbine wheel 26 having the buckets 23 mounted thereon, is rotatably mounted on the engine axis 27 by suitable mounting means including a bearing arrangement 28. The turbine unit comprising the wheels 24 and 26 and the shaft 25 drives the compressor (not shown) of the engine 10. It will be noted that the entire flow of combustion products passes through the annular nozzle diaphragms 20 and 22 and over the rows of turbine buckets 21 and 23. If the gas turbine engine 10 is to operate at the efficiency and power levels desired in modern gas turbine engines, the combustion products must be discharged from the combustion liner 14 at temperatures higher than those which can be withstood without cooling by vanes made of currently available materials. The present invention helps make this desired efficiency possible by providing adequate cooling in a highly efficient manner for the turbine buckets.

Turning attention now to FIGS. 2–4, one of the turbine buckets 21 is illustrated in detail, the construction of the turbine buckets 23 being substantially identical to that of the illustrated bucket 21. To maintain a high degree of structural integrity and high strength, the bucket 21 is a one-piece member of cast or similar construction. More particularly, the bucket 21 includes a base portion 30 of dovetail or fir-tree configuration for mating with a suitable slot 32 in the periphery of the turbine wheel 24 and an airfoil-shaped portion 34 formed integrally with the base portion 30 and projecting radially therefrom relative to the turbine wheel 24. The airfoil 34 is substantially hollow and has a convex side wall 35 and a concave side wall 36 interconnecting axially spaced upstream leading and downstream trailing edges 38 and 39, respectively. As best shown by FIG. 4, the aerodynamic shape of the airfoil 34 at the leading edge 38 is rounded and rather blunt while the trailing edge region is tapered and quite thin. To cool these critical leading and trailing edge regions, as well as the mid-chord region, in accordance with the present invention, each airfoil 34 is formed with heat exchange passages therein. To form these passages, the hollow interior of the airfoil 34 of the bucket 21 is divided by a partition 40 extending the entire longitudinal extent of the airfoil 34 into a first heat exchange region 42 adjacent the mid-chord region only of the concave side wall 36 and a second heat exchange region 44 adjacent the leading edge 38, the convex side wall 35, and the trailing edge 39. The two regions 42 and 44 are interconnected by a large number of openings 45 and 55 in the partition 40, the openings 45 and 55 having small flow areas. To permit the introduction of cooling air or other suitable cooling fluid into the airfoil 34, inlet passages 46 communicating with the first region 42 are provided in the base portion 30 and, to permit the discharge of used cooling air from second region 44 of the turbine bucket 21, radially spaced-apart axially extending passages 48 are provided in the trailing edge 39. In the trailing edge region of the airfoil 34, intermediate the openings 45 and 55 and the discharge passages 48, the second region 44 has a large number of pins 50 disposed therein for producing turbulence and providing extended heat exchange area, the pins 50 extending transversely across the second region 44 between the partition 40 and the convex side wall 35. Again, to maintain high strength and a high degree of structural integrity, the partition 40 and the pins 50 are formed integrally with the remainder of the turbine bucket 21.

In operation, relatively cool high pressure air from the combustion space 16 is extracted through the inner wall 13 and supplied to the base portion 30 of the turbine buckets 21 as illustrated by the arrows of FIG. 1. The air then flows outwardly through the inlet passages 46 in the base portion 30 in the first region 42 where the flowing air convection cools the mid-chord region of the concave side wall 36, this portion of the vane body 34 being the least critical from a heat transfer standpoint since the external coefficients of heat transfer are at their lowest on the concave wall 36. Accordingly, the concave wall 36 may be cooled adequately with essentially laminar flow of the cooling air within the first region 42. From the first region 42, the cooling air flows through the small openings 45 and 55 into the second region 44 where the same air is used to convection cool the leading edge 38, the convex side wall 35, and the trailing edge 39. These latter portions of the bucket 21 are extremely critical from a heat transfer standpoint since high coefficients of heat transfer exist on their exterior surfaces. To cool these portions with the same air used to cool the concave wall 36 (which is now warmer than it was when used to cool the wall 36), it is essential that extremely high coefficients of convection heat transfer exist on the interior wall surfaces. In accordance with the present invention, the openings 45 and 55 make such high coefficients possible by accelerating the cooling air and directing it as a large number of high velocity jets against the interior wall surfaces at the leading edge 38 and the upstream and mid-chord sections of the convex wall 35. Thus, these surfaces are not cooled by laminar flow of cooling air, but by extremely turbulent flow of the air. Similarly, the pins 50 in the trailing edge section of the second region 44 cause turbulence and accompanying high heat transfer coefficients in the cooling air as it flows to the outlet passages 48 in the trailing edge 39. In addition, the pins 50 provide an extended heat transfer area upon which the high coefficients of heat transfer can act.

For adequate cooling of the bucket 21, it is desirable that all exterior portions of the airfoil 34 be cooled to essentially the same temperature so that thermal stresses are minimized. Accordingly, as indicated above, it is essential that the overall rates of heat transfer at some portions of the airfoil be greater than the rates at other portions. For example, although both the leading edge 38 and the mid-chord section of the convex wall 35 are cooled by the cooling air impinging thereon, it is desirable that a greater rate of heat transfer exist at the leading edge 38 since this is the most critical region of the entire airfoil 34. This may be accomplished in accordance with the present invention by locating and sizing the openings 45 and 55 such that a greater density of jets is present at and near the leading edge 38 than at the mid-chord section. Similarly, the temperature of the trailing edge 39 relative to the remainder of the airfoil 34 can be controlled by controlling the number, and the surface area, of the pins 50. In other words, for adequate and efficient utilization of cooling air, it is essential that the inlet passages 46, the partition 40 and hence the regions 42 and 44, the openings 45 and 55, the pins 50, and the outlet passages 48 be proportioned to permit sufficient, but not excessive, flow through all portions of the turbine bucket 21. This can be accomplished by controlling, as noted above, the number and individual flow areas of the various openings, the cross-section flow areas of the internal heat transfer regions and, of course, the pressure differential between the interior regions of the airfoil 34 and the static pressure of the cooling air supplied to the turbine bucket 21. In summary, the cooling requirements of the various vane sections will dictate their precise relative proportions. By making small changes in the relative proportions of the sections comprising the turbine buckets 21 of this invention, turbine designers will be able to accommodate extremely wide ranges of cooling requirements.

In the foregoing discussion, it has been pointed out that the openings 45 and 55 are located and sized to direct jets of high velocity cooling fluid against the interior surfaces of the airfoil 34. To achieve this, the openings 45 are small holes in the partition 40, and the opening 55 at the junction of the partition 40 and the concave side wall 36 is preferably a thin slot extending the entire longitudinal length of the airfoil 34. This slot 55 separates, or mechanically decouples, the partition 40 which is quite cool since it is entirely surrounded by cooling fluid from the higher temperature concave side wall 36. The result is, of course, much lower thermal stresses than would be present if the partition 40 were mechanically coupled with the outer side wall 36. Although the slot 55 is provided for stress relief, it should be noted that the partition is still integrally formed with the base portion 30, and the convex side wall 35 for overall strength and structural integrity.

As discussed above, the turbine bucket 21 is of integral construction so as to assure high strength and structural integrity. In particular, the bucket 21 is readily adaptable to being cast of any suitable high temperature alloy, the outlet passages 48 providing a means for supporting suitable cores for forming the first and second regions 42 and 44, respectively, and the pins 50 during the casting process. The inlet passages 46 and the openings 45 and 55 in the partition 40 can then be drilled or otherwise formed by conventional methods, and the tip of the bucket 21 can be capped as at 60 in FIG. 2 by a suitable welding method to complete the integral bucket 21. It will readily occur to those skilled in the art that the bucket 21 can thus be manufactured with conventional techniques at relatively low cost. Other suitable methods of forming the integral bucket 21 will, of course, also be obvious. For example, the bucket can be cast in a number of sections, which can then be diffusion bonded into an integral and high strength structure. Because of the very high mechanical stresses present in the bucket 21 during engine operation, however, the bucket 21 should not be of fabricated construction because of the difficulties involved in providing high strength joints with conventional joining techniques.

It will thus be seen that this invention provides a cooled turbine bucket in which high strength and structural integrity are maintained while utilizing substantially the minimum amount of cooling fluid consistent with adequate cooling of the bucket.

It will be understood that the invention is not limited to the specific details of the construction and arrangement of the particular embodiment illustrated and described herein. It is therefore intended to cover in the appended claims all such changes and modifications which may occur to those skilled in the art without departing from the true spirit and scope of the invention.

What is claimed as new and is desired to secure by Letters Patent of the United States is:

1. In an axial flow turbine, a high strength turbine bucket comprising:
   a base portion for securing the bucket to a turbine rotor,
   a closed airfoil portion integrally formed with said base portion and projecting radially therefrom,
   said airfoil portion including convex and concave side walls interconnecting spaced upstream leading and downstream trailing edges,
   a partition integrally formed with said convex and concave side walls for dividing the interior of the airfoil portion into first and second radially extending heat transfer regions,
   said first region being adjacent the mid-chord section only of one of said side walls and said second region being adjacent said leading and trailing edges and the entire chord section of the other of said side walls,
   inlet means in said base portion for admitting working fluid to said first region,
   a plurality of throttling openings in said partition for accelerating cooling fluid and for directing the high velocity cooling fluid from said first region to said second region, the high velocity cooling fluid impinging on selected surfaces within said second region such that high local coefficients of convection heat transfer are generated therein,
   outlet means for discharging cooling air from said second region, and said first region is adjacent said concave side wall and said second region is adjacent said convex side wall, whereby said second region is located adjacent the most temperature critical portions of the turbine bucket.

2. A high strength turbine bucket as defined by claim 1 in which said outlet means comprises a plurality of radially spaced-apart passages at the trailing edge of said vane portion.

3. A high strength turbine bucket as defined by claim 1 in which said throttling openings are located in said partition means to direct the high velocity cooling fluid against the interior wall surfaces of the leading edge and the upstream and mid-chord sections of said convex side wall.

4. A high strength turbine bucket as defined by claim 3 in which said throttling openings include a slot extending the longitudinal length of said airfoil portion closely adjacent the junction of said partition and said concave side wall.

5. A high strength turbine bucket as defined by claim 3 in which said outlet means comprises a plurality of radially spaced-apart passages at the trailing edge of said vane portion.

6. A high strength turbine bucket as defined by claim 5 further comprising turbulence producing means in the trailing edge section of said second region for providing high local coefficients of convection heat transfer within said trailing edge section, said turbulence producing means being formed integrally with the remainder of said vane portion.

7. A high strength turbine bucket as defined by claim 6 in which said turbulence producing means comprises pins projecting between said partition and said convex wall to provide extended heat transfer area in said trailing edge section.

8. A high strength turbine bucket as defined by claim 7 in which said throttling openings are located and sized to adequately cool the leading edge and the upstream and mid-chord regions of said convex side wall with a minimum flow of cooling fluid.

9. A high strength turbine bucket as defined by claim 7 in which said inlet means, said partition, said throttling openings, said pins, and said trailing edge passages are proportioned to assure adequate cooling of all vane portions with the minimum practicable flow of cooling fluid.

10. A high strength turbine bucket as defined by claim 9 in which said throttling openings include a slot extending the longitudinal length of said airfoil portion closely adjacent the junction of said partition and said concave side wall.

* * * * *

UNITED STATES PATENT OFFICE
CERTIFICATE OF CORRECTION

Patent No. 3,844,678      Dated October 29, 1974

Inventor(s) Albert P. Sterman et al.

It is certified that error appears in the above-identified patent and that said Letters Patent are hereby corrected as shown below:

Column 7, line 10, after "interconnecting" insert -- axially --.

Signed and sealed this 24th day of December 1974.

(SEAL)
Attest:

McCOY M. GIBSON JR.
Attesting Officer

C. MARSHALL DANN
Commissioner of Patents